Patented May 6, 1941

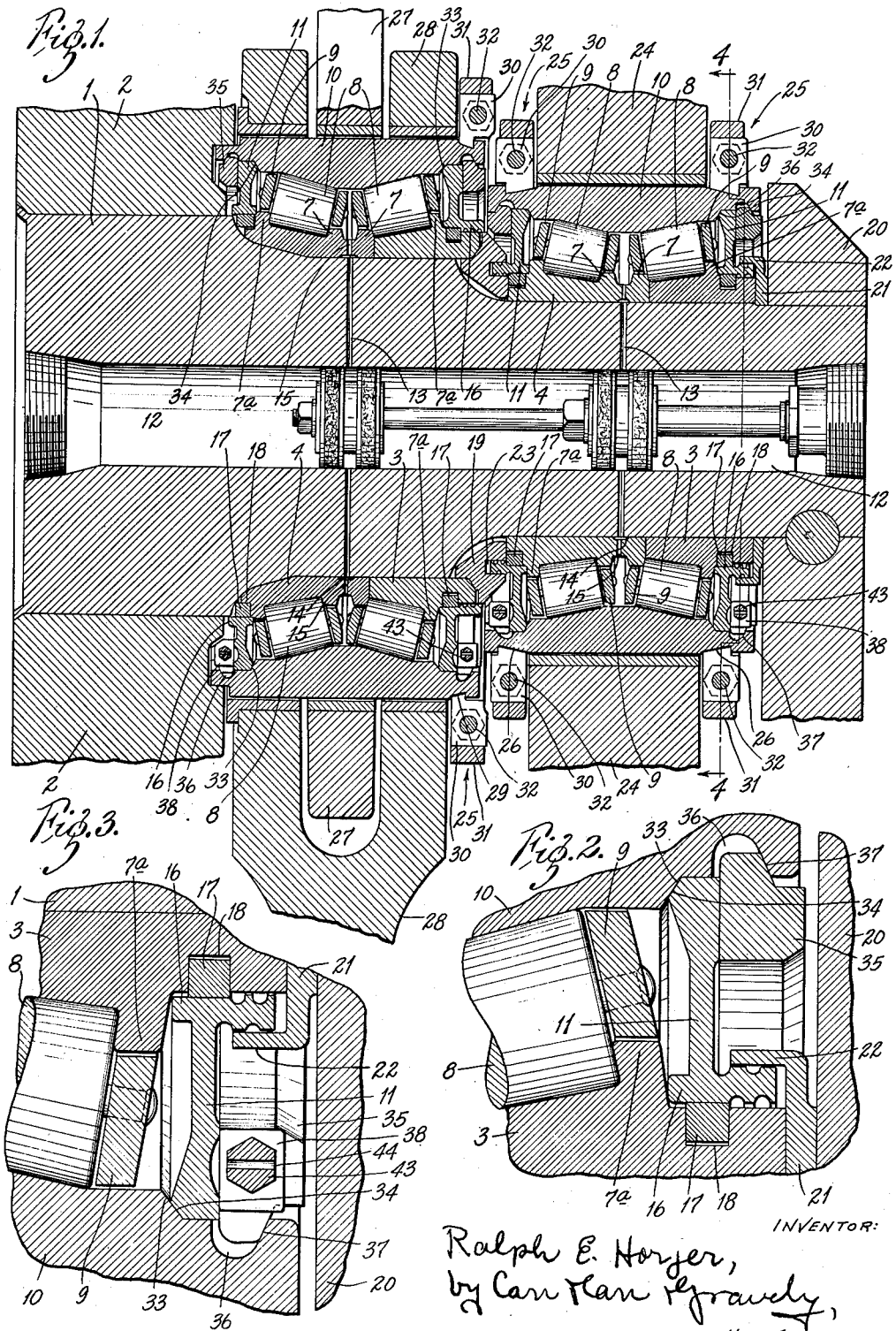

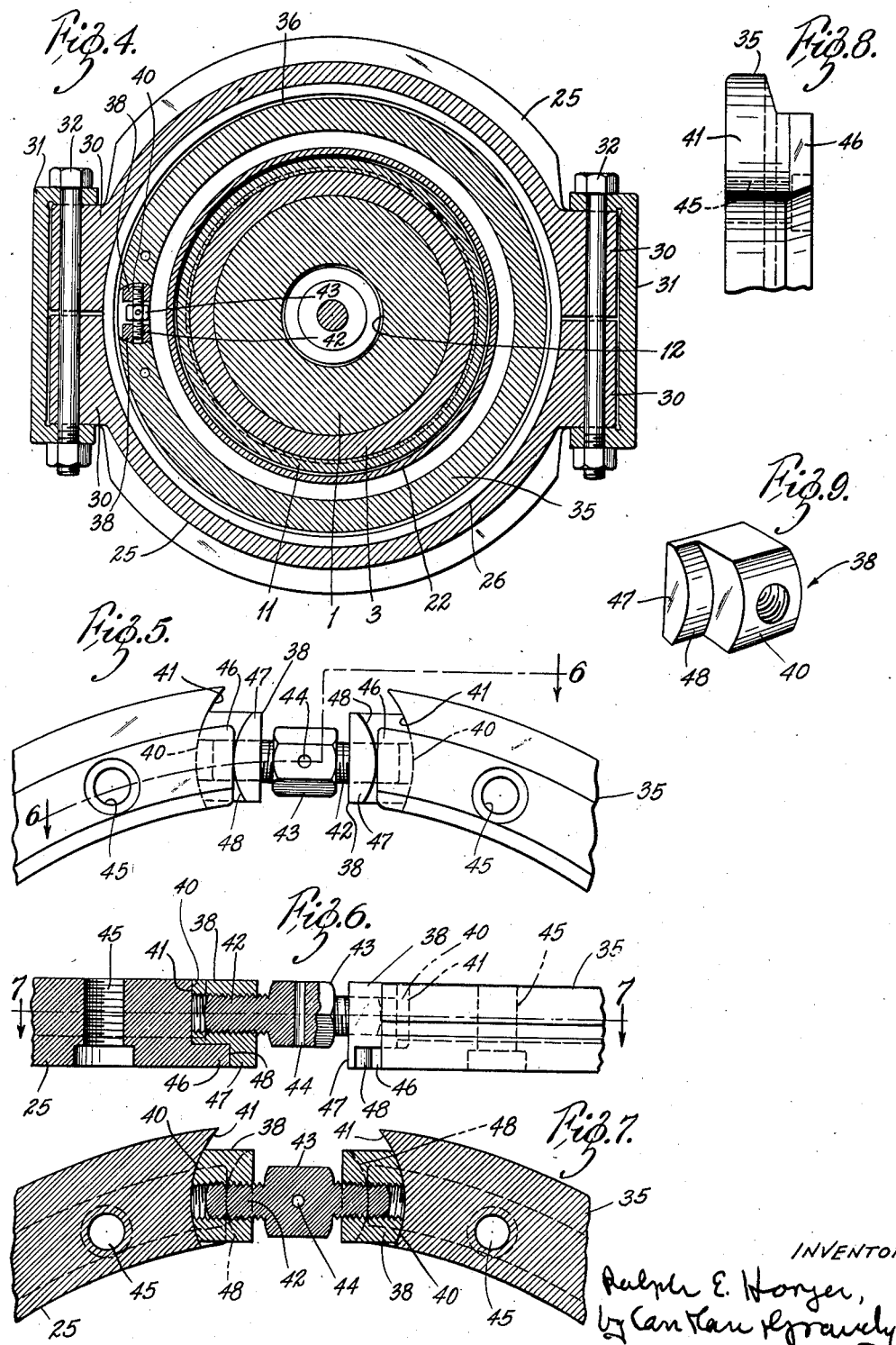

2,241,350

UNITED STATES PATENT OFFICE 2,241,350

LOCOMOTIVE ROD BEARING

Ralph E. Horger, Canton, Ohio, assignor to The Timken Roller Bearing Company, Canton, Ohio, a corporation of Ohio Application March 20, 1939, Serial No. 262,863

13 Claims. (Cl. 308—187.1)

This invention relates to bearings, particularly locomotive rod bearings, and has for its principal object to improve the bearing of Buckwalter Patent No. 1,951,126 and especially to relieve the oil retaining end closures of the bearing from the pressure of the rod ends, to permit the removal of the rod ends from the bearing without disturbing the end closures and to provide for the easy mounting and dismounting of the end closure and the retaining members for the rod ends. The invention consists in the arrangements and combinations of parts hereinafter described and claimed.

In the accompanying drawings, which form part of this specification and wherein like symbols refer to like parts wherever they occur, Fig. 1 is a central horizontal section through a locomotive rod bearing construction embodying my invention, Fig. 2 is an enlarged fragmentary horizontal section through said bearing construction in the region of one of the end closures and the split locking ring therefor, Fig. 3 is a section similar to Fig. 2, the section being taken through the split portion of said locking ring, Fig. 4 is a vertical cross-section on the line 4—4 in Fig. 1, Fig. 5 is a fragmentary outer end view of one of the locking rings and the spreading device therefor, Fig. 6 is a section on the line 6—6 in Fig. 5, Fig. 7 is a section on the line 7—7 in Fig. 6, Fig. 8 is a fragmentary view of one of the spreading block receiving ends of said ring; and Fig. 9 is a perspective view of one of the ring spreading or expanding blocks.

The present construction comprises a crank pin 1 mounted on a main driving wheel 2 of a locomotive. On this main crank pin or shaft are mounted two double, taper roller bearings located one on the inner end portion of said pin and the other on the reduced outer end portion thereof. The two double roller bearings are substantially the same except for differences in size and proportion. Each of said bearings comprises two cones or inner raceway members 3 and 4 whose raceways taper towards each other and have guide ribs 7 at their small or adjacent ends and thrust ribs 7a at their remote ends. Circular series or rows of tapered rollers 8, with suitable retaining cages 9 therefor, are provided for the respective cones 3 and 4; and the conical outer raceways for the respective series of rollers are formed in a single sleeve or outer raceway member 10.

Each double bearing is provided with annular end closure plates 11 that fit between the inner and outer raceway members at the ends of the bearing and close the annular space therebetween. This annular space is supplied with lubricant from an axial reservoir 12 in the crank pin through radial passageways 13 therein that open into an internal annular groove 14 in the inner raceway member 4, which has the two raceway ribs 7 formed thereon and radial passageways 15 that lead from said annular groove and open into said annular space. The end closures have hubs 16 that are sleeved on the adjacent ends of the respective inner raceway members and snugly fit split piston type sealing rings 17 that seat in annular grooves or recesses 18 provided therefor in said raceway members. The two double roller bearings are spaced apart by means of a spacer sleeve 19 sleeved on the crank pin in abutting relation to the adjacent ends of the inner raceway member 4 of the outermost bearing and the inner raceway member 3 of the innermost bearing. The bearings and spacer sleeve are held on the crank pin by the eccentric crank 20 of the locomotive valve gear (not shown), said crank being pinned on the outer end of said crank pin and serving to clamp a spacing ring 21 against the outer end of the inner raceway member 3 of the outermost bearing. This spacing ring or washer has an inwardly extending peripheral flange 22 that overlaps the hub of the outermost end closure of the outermost bearing, while the hub of the innermost end closure of said bearing extends into an annular groove 23 in the adjacent end of the spacer sleeve 19.

The main or connecting rod 24 of the locomotive is freely mounted on the outer raceway member of the outermost double bearing between retaining rings 25 mounted in external annular grooves 26 provided therefor on said raceway member on opposite sides of the rod end. Two side or coupling rods, a front side rod 27 and a rear side rod 28 are freely rotatable on the outer raceway member of the innermost double bearing between a retaining ring 25 seated in an external annular groove 29 near the outer end of said member and the hub portion of the main driving wheel 2. As shown in the drawings, the rear side rod 28 has a forked bearing receiving end and the adjacent end of the front side rod 27 is disposed between the two branches thereof.

Each of the rod abutment or retaining rings is split to facilitate assembly thereof in the groove 26 of the outer raceway member; and the two halves of the ring are provided at their meeting ends with lugs 30 that are drawn together to cause the ring to seat tightly in said groove by C-clamps 31 and by bolts 32 that pass through registering holes provided therefor in said lugs and clamps. As shown in the drawings, the bottom of each ring receiving groove 26 and the inner periphery of the ring 25 therefor, taper toward the end of the bearing so that the ring is forced tightly against the outer wall of said groove.

Each of the end closures 11 is a solid ring which slips over the piston ring type seal 17 and has a beveled surface 33 that seats against a beveled valve type seat 34 in the bore of the outer raceway member 10. The end closure is held tightly against its beveled seat 34 by means of a split retaining and clamping ring 35 that seats within an annular groove 36 provided therefor in the bore of the outer raceway member. The outer wall of the groove 36 and the face of the split ring 35 cooperating therewith are inclined, as at 37, in the direction of the end closure so that expansion of said ring will move the same inwardly and thus force the end closure 11 retained thereby tightly against its seat 34 in the outer raceway member.

Each split closure retaining ring 35 is expanded into tight engagement with the inclined wall of the groove 36 in the outer raceway member by means of a spreading device comprising a pair of blocks 38, which fit between the spaced ends of said ring and have convexly curved ends 40 that seat in concave seats 41 in said ends, and a screw 42 that is threaded into bores provided therefor in the respective blocks. The screw 42 is provided at one end with right hand threads and at the other end with left hand threads, whereby said blocks are caused to move towards or away from each other, depending upon the direction in which the screw is rotated. The adjusting screw 42 has its middle portion 43 shaped to receive a wrench and provided with a hole 44 for a wire (not shown) for locking the screw in the desired adjusted position. The locking ring 35 is provided on opposite sides of the split therein with threaded holes 45 adapted to be engaged by threaded pins (not shown) to facilitate drawing the ends of said ring together when it is mounted in and removed from the groove 36 in the outer raceway member. The blocks 38 are self-centering in the concave seats 41 in the ends of the ring 35 and are held in place by said seats and by lugs 46 that are formed on the ends of said ring and overlap the outer sides of said blocks. Said blocks are preferably provided at their inner ends with outstanding lugs 47 that overlap the flat ends of the lugs 46 and have their surfaces 48 that face said flat ends convexly curved to permit free rocking movement of said blocks in the concave seats 41 in the ends of the locking ring 35.

By the arrangement described, the rods are retained on the bearings by the split abutment rings 25, that are held tightly in the grooves provided therefor in the outer raceway members of said bearings by the clamps 31 and bolts 32, the removal of which permits the retaining rings to be readily detached and the rods removed and replaced without disturbing the closure rings. These abutment rings also tend to prevent spreading of the outer ends of the outer raceway members under the expansive force of the closure retaining rings and thus maintain a tight engagement of the closures against the beveled seat in the bore of said outer raceway members. The end closures 11 are held by the expansible retaining rings 35 tightly against their seats in the ends of the outer raceway members of the bearings and thus prevent leakage of lubricant therefrom; and these closure plates may be readily removed and replaced without disturbing the rods or the abutment rings therefor by loosening the spreading screws 42 for the closure retaining rings and drawing their split ends together so as to clear the grooves 36. When the closure retaining and sealing rings 35 are expanded against the beveled walls 37 of the grooves 36, said rings are forced inwardly against the closures and thus cause them to seat tightly against the seats provided therefor in the outer raceway members.

Obviously, the hereinbefore described arrangement admits of considerable modification without departing from the invention. Therefore, I do not wish to be limited to the precise construction shown and described.

What I claim is:

1. Closure means for the annular space between relatively rotatable inner and outer members comprising an annular end closure interposed between said members adjacent to one end thereof, said outer member having an internal annular groove and an internal annular abutment shoulder for said closure inwardly of said groove, a split retaining ring mounted in said groove for holding said closure against said abutment shoulder, said groove and ring having cooperating portions adapted to force said ring against said closure when said ring is expanded into said groove, and means interposed between the ends of said split ring for expanding the same into said groove, said means comprising a pair of blocks positioned between the ends of said split ring, and means for moving said blocks towards and away from each other into and out of engagement with said ends of said ring.

2. Closure means for the annular space between relatively rotatable inner and outer members comprising an annular end closure interposed between said members adjacent to one end thereof, said outer member having an internal annular groove and an internal annular abutment shoulder for said closure inwardly of said groove, a split retaining ring mounted in said groove for holding said closure against said abutment shoulder, said groove and ring having cooperating portions adapted to force said ring against said closure when said ring is expanded into said groove, and means interposed between the ends of said split ring for expanding the same into said groove, said means comprising a pair of blocks positioned between the ends of said split ring, and means for moving said blocks towards and away from each other into and out of engagement with said ends of said ring, said blocks having arcuate surfaces at their remote ends and said ends of said ring having arcuate seats for the arcuate ends of the respective blocks.

3. Closure means for the annular space between relatively rotatable inner and outer members comprising an annular end closure interposed between said members adjacent to one end thereof, said outer member having an internal annular groove and an internal annular abutment shoulder for said closure inwardly of said groove, a split retaining ring mounted in said groove for holding said closure against said abutment shoulder, said groove and ring having cooperating portions adapted to force said ring against said closure when said ring is expanded into said groove, and means interposed between the ends of said split ring for expanding the same into said groove, said means comprising a pair of blocks positioned between the ends of said split ring and a screw having a right hand thread at one end in engagement with one of said blocks and a left hand thread at the opposite end thereof in engagement with the other of said blocks.

4. Closure means for the annular space between relatively rotatable inner and outer members comprising an annular end closure interposed between said members adjacent to one end thereof, said outer member having an internal annular groove and an internal annular abutment shoulder for said closure inwardly of said groove, a split retaining ring mounted in said groove for holding said closure against said abutment shoulder, said groove and ring having cooperating portions adapted to force said ring against said closure when said ring is expanded into said groove, and means interposed between the ends of said split ring for expanding the same into said groove, said means comprising a pair of blocks positioned between the ends of said split ring and a screw having a right hand thread at one end in engagement with one of said blocks and a left hand thread at the opposite end thereof in engagement with the other of said blocks, the remote ends of said blocks being convexly curved and the ends of said ring having concave seats therein for the convex ends of the respective blocks.

5. Closure means for the annular space between relatively rotatable inner and outer members comprising an annular end closure interposed between said members adjacent to one end thereof, said outer member having an internal annular groove and an internal annular abutment shoulder for said closure inwardly of said groove, a split retaining ring mounted in said groove for holding said closure against said abutment shoulder, said groove and ring having cooperating portions adapted to force said ring against said closure when said ring is expanded into said groove, and detachable means interposed between the ends of said split ring for expanding the same into said groove, said means comprising a pair of blocks positioned between the ends of said split ring, means for moving said blocks towards and away from each other into and out of engagement with said ends of said ring, the remote ends of said blocks being convexly curved and the ends of said ring having concave seats therein for the convex ends of the respective blocks, said ends of said ring having portions extending beyond said concave seats and overlapping the outer faces of the respective blocks.

6. A bearing comprising inner and outer raceway members, an annular end closure for the annular space between said members, said outer raceway member having an internal annular groove and a beveled annular seat for said end closure inwardly of said groove, a split ring in said groove, means for expanding said ring, said ring and said groove having cooperating portions thereof shaped to press said ring against the outer face of said closure when said ring is expanded into said groove, said outer raceway member being provided adjacent to said closure and said ring with an external annular groove, a split ring seated in said groove, and means for clamping said last mentioned ring in said external annular groove.

7. A bearing comprising inner and outer raceway members, an annular end closure for the annular space between said members, said outer raceway member having an internal annular groove and a beveled annular seat for said end closure inwardly of said groove, a split expansible ring in said groove, means for expanding said ring in said groove, said ring and said groove having cooperating portions thereof shaped to press said ring against the outer face of said closure when said ring is expanded into said groove, said outer raceway member being provided adjacent to said closure and said ring with an external annular groove and a split external ring seated in said groove, and means for clamping said last mentioned ring in the external annular groove, said ring and said external groove having cooperating portions thereof shaped to force said ring against the outer side wall of said external groove when said ring is clamped therein.

8. A bearing comprising inner and outer raceway members, an annular end closure for the annular space between said members, said outer raceway member having an internal annular groove and a beveled annular seat for said end closure inwardly of said groove, a split expansible ring in said groove, means for expanding said ring, said ring and said groove having cooperating inclined portions adapted to force said ring against the outer face of said closure when said ring is expanded into said groove, said outer raceway member being provided adjacent to said closure and said ring with an external annular groove and a split external ring seated in said groove, means for clamping said last mentioned ring in said external groove, said ring and said external groove having conical cooperating portions adapted to force said ring against the outer side wall of said groove when said ring is clamped therein, a clamp engaging the end of said external ring, and a bolt extending through said clamp and said ends.

9. A bearing comprising inner and outer raceway members, an annular end closure for the annular space between said members, said outer raceway member having an internal annular groove and a beveled annular seat for said end closure inwardly of said groove, a split expansible ring in said groove, means for expanding said ring, said ring and said groove having cooperating portions thereof shaped to press said ring against the outer face of said closure when said ring is expanded into said groove, said outer raceway member being provided adjacent to said closure and said ring with an external annular groove and a split external ring seated in said groove, means for clamping said last mentioned ring in said external groove, said ring and said external groove having cooperating portions thereof shaped to force said ring against the outer side wall of said groove when said ring is clamped therein, and a member freely rotatable on said outer raceway member inwardly of said clamping ring and retained thereby on said outer raceway member.

10. A locomotive rod bearing construction comprising inner and outer raceway members, a crank pin supporting said inner raceway member, a rod rotatable on said outer raceway member, an annular end closure interposed between said raceway members adjacent to each end of said bearing, said outer raceway member having an internal annular groove and an internal annular abutment for said closure inwardly of said groove, a split retaining ring mounted in said groove for holding said closure against said abutment, said ring and groove being shaped to force said ring inwardly against said closure when the ring is expanded into said groove, a rod rotatable on said outer raceway member, said outer raceway member having an external annular groove therein between said rod and the end of said bearing, and a split ring clamped in said external groove for retaining said rod on said outer raceway member.

11. A locomotive rod bearing construction comprising inner and outer raceway members, a crank pin supporting said inner raceway member, a rod rotatable on said outer raceway member, annular end closures for the annular space between said raceway members, rod abutment members on said outer raceway member on opposite sides of said rod, and separate means for retaining said rod abutment members and end closures in place, whereby either of said rod abutment members and end closures may be removed and replaced independently of the other.

12. A locomotive rod bearing construction comprising inner and outer raceway members, a crank pin supporting said inner raceway member, a rod rotatable on said outer raceway member, annular end closures for the annular space between said raceway members, and separate means for retaining said rod and said end closures in place, whereby either of said rods and end closures may be removed and replaced independently of the other.

13. A locomotive rod bearing construction comprising inner and outer raceway members, a crank pin supporting said inner raceway member, a rod rotatable on said outer raceway member, annular end closures for the annular space between said raceway members, a rod abutment member on said outer raceway member at one side of said rod, and separate means for retaining said rod abutment member and said end closure in place, whereby either of said rod abutment member and end closure may be removed and replaced independently of the other.

RALPH E. HORGER.